April 8, 1930.　　　　F. H. BEST　　　　1,753,231

METER FOR TRANSMISSION TESTING

Filed Feb. 25, 1928

INVENTOR
F. H. Best
BY
ATTORNEY

Patented Apr. 8, 1930

1,753,231

UNITED STATES PATENT OFFICE

FRED H. BEST, OF WESTFIELD, NEW JERSEY, ASSIGNOR TO AMERICAN TELEPHONE AND TELEGRAPH COMPANY, A CORPORATION OF NEW YORK

METER FOR TRANSMISSION TESTING

Application filed February 25, 1928. Serial No. 257,019.

This invention relates to electric meters, and more particularly to meters of the direct current type which are adapted for transmission testing.

The general type of electric meter which is suitable for use in direct current work is also commonly used in transmission testing work. This type of meter is of such construction that the deflection of its pointer is proportional to the current through the moving coil of the meter.

When this type of instrument is used to indicate the current through a heater of a thermocouple or the current in the output of a rectifier, the deflection of the pointer of the meter is proportional to the square of the applied current. This results in a scale which is crowded near the zero point and greatly spread out near maximum deflection. If the scale of such meter is calibrated in transmission units rather than actual current, a similar scale results, and the units at the upper end of the scale are many times larger than those at the lower.

In transmission testing work it is also common practice to employ a detector or rectifier and a direct current meter for measuring alternating current. When transmission measurements are made with this combination, calibrating the scale in transmission units gives a scale similar to that referred to above, as obtained with a thermocouple or rectifier.

The characteristics of the circuits previously used to obtain a uniform transmission unit scale with ordinary meters are such that they are unsuitable for certain types of measurements. It has therefore been desirable to design a meter in which the resulting scale for measuring transmission units will give uniform divisions when the meter is used with a detector or rectifier.

It is an object of this invention to provide a test meter in which the scale for indicating the value of units such as transmission units, will have uniform divisions or graduations throughout when a moving system of the conventional type is employed in which the movement of the coil is proportional to the current through the coil.

This, and further objects will be apparent from the following description, when considered in connection with the accompanying drawing, in which one embodiment of the invention is illustrated.

Figure 1:
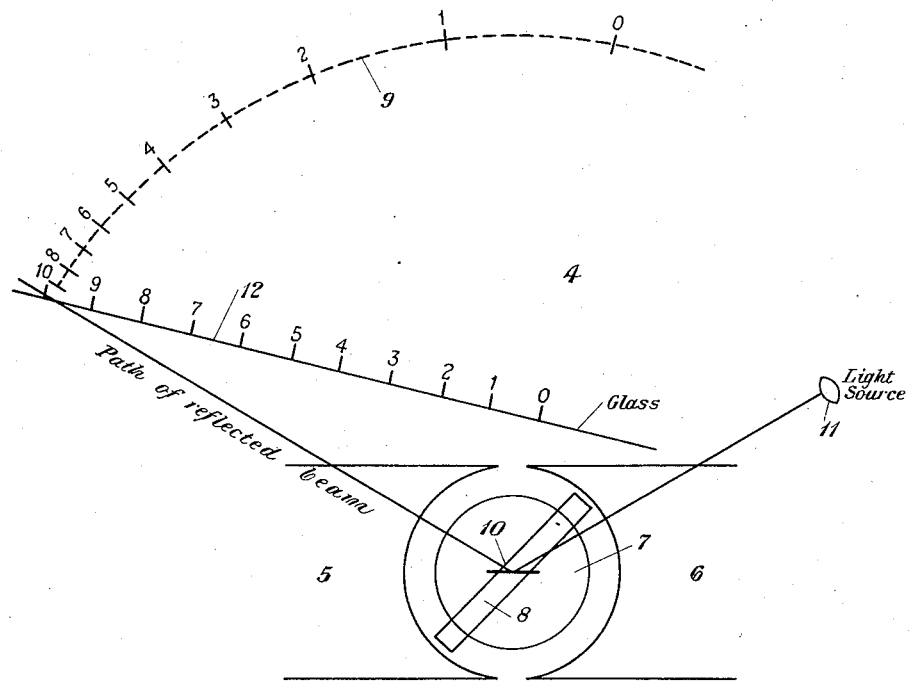
Figure 2:
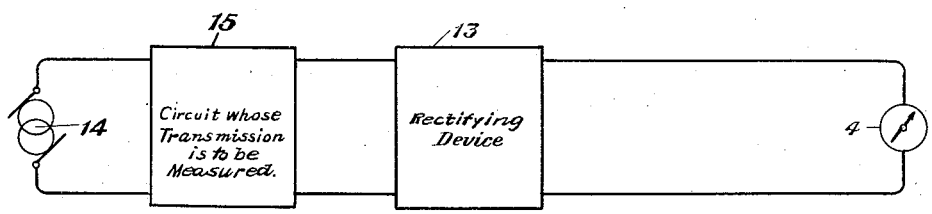

Referring to the drawing, Figure 1 indicates diagrammatically one embodiment of the improved device, and Fig. 2 is a diagram of a circuit with which said device is adapted to be used.

In the drawing, such parts of the improved meter 4 are shown as are essential to a full understanding of the invention. The numerals 5 and 6 designate pole pieces which are positioned on either side of a stationary iron cylinder 7. These pole pieces may be of the usual soft iron composition and are associated with permanent magnet of well-known construction. A coil 8, of the usual character, provided with windings through which flows current to be measured, is pivoted to rotate in the air gap between the pole pieces and the cylinder 7.

In the common type of direct current meter and one which is in general use, effort is made to obtain a uniform flux distribution in the air gap between the pole pieces and the iron cylinder so that the deflection of the moving coil will be proportional to the current flowing through it. When the meter measures the current in the output of a rectifier, detector, or the like, and it is desired to have the scale read in units proportional to the input current or to the transmission loss (or gain) of which the input current is a measure, the scale will not have uniform graduations due to the square relation that exists between the input and output currents and due to the indirect relation that exists between the transmission unit and current. The scale, and its graduation for this form of meter, would be approximately as shown in dotted lines and indicated by the character 9 for the case where a common type of direct current meter is used with a detector to measure transmission. The figures used in connection with the graduations indicate transmission units. With this form of scale great accuracy cannot be obtained between the values 5 and 10 of the transmission units, and the accuracy between the values 0 and 3 transmission units is much greater than necessary.

A distorted scale resulting as above described, arising due to the fact that an instrument which measures current is being used to measure transmission loss (or gain), when, as a matter of fact, the transmission unit is not proportional to the current. The transmission to be measured is the ratio of the energy received at the distant end of the circuit to that applied at the transmitting end so that we have a known amount of applied energy and measurement of the received current as an indication of the amount of energy received, and, from this, the ratio may at once be obtained. The unit which is used in measuring the magnitude of this ratio is, however, of such a character that a direct relation does not exist between the received current and the transmission. For example, let us assume a circuit in which there is no transmission loss so that all the energy applied is received at the receiving end. Now, due to the nature of the transmission unit, if we introduce a transmission loss equal to a certain number of transmission units, say X-transmission units, the received current will be one-half what it was before. If, now, we add X-additional units of transmission loss, so that the total loss will be 2X, the transmission is again halved so that it is one-quarter of its original value. If X-additional units of transmission loss be now added to the circuit, making a total of 3X, the current will be one-eighth of its original value. Thus, it will be seen that though the transmission loss is increased by successive, equal increments, the received current is decreased in such a manner that each time its value is one-half what it was previously and, although it approaches zero, never actually becomes zero. It is this indirect relationship between the received current and the transmission equivalent of the circuit that results in the distorted scale above described, and, which it is desired to overcome by the present invention.

In the improved arrangement, there is provided an indicator, or reflector, 10, which may be of any suitable character, such, for instance, as a mirror. This indicator is so associated with the movable element of the meter that it rotates therewith when current to be measured flows through coil 8. A source of light 11 projects a ray which is centered on the indicator, and the path of this projected ray or beam is reflected on to a scale 12. The scale may be composed of glass, or material of like character, and is shown positioned at an angle to the horizontal. Its graduations are so arranged that the path of the reflected beam from the member 10 will be focussed thereon as the beam shifts in response to the current which flows through the winding of coil 8. The inclination of the scale 12, to give the proper uniform graduations thereon, may be determined by drawing lines from the graduations on scale 9 to a common center or axis of the coil 8. The points on the scale 12 intersected by these lines will be uniformly spaced, and will provide graduations of value on said scale corresponding to similarly designated graduations on scale 9. The angle of the glass scale is such that, although the angle of the reflected beam is comparatively small when the input current to be measured is small, nevertheless, such small motion of the moving coil 8 will produce, at this end of the scale, a relatively large shift of the spot of light along the scale. As the moving system turns, the change of the reflected spot of light on the scale per degree of movement becomes less and less as the deflection increases until the reflected beam is approximately at right angles to the scale, in which case the minimum movement of the spot of reflected light is obtained. While there is disclosed in the drawing a scale having a flat formation, which gives approximately uniform scale divisions in terms of detector input energy, it will be understood that such scale may be of other formation, such as a curved formation where greater scale uniformity is desired. By means of the foregoing arrangement, the variation in the field from point to point, as the indicator moves, is of such character as to compensate for the indirect relation that exists between the received current and the transmission loss (or gain) of which the current is a measure. It may also compensate for the indirect relation which exists between the rectified current which actuates the meter and the received alternating current which is really to be measured and from which the rectified current is derived.

The diagram shown in Fig. 2 illustrates the connection of the meter 4 in a circuit with which it is adapted to be used. The input side of the circuit consists of a source of alternating current 14, which is transmitted over a circuit 15 and the received current applied to a rectifying device 13. The rectifying device may be of any suitable character, such as a detector, rectifier, thermocouple or the like. The output side of the circuit consists of a meter 4 of the character above outlined, which is connected by a pair of conductors to the rectifying device 13. The alternating current which is received from a transmission circuit whose transmission is to be measured passes through the rectifying device 13 and is rectified thereby into direct current in a well understood manner. The rectified or direct current flows through the meter 4 which indicates, by the improved scale structure above described, the amount of current corresponding to the alternating current flowing from the source 14. The reading on the scale 12 will then be a reading of the transmission loss (or gain) of the circuit 15.

What is claimed is:

1. A meter having a rotatable coil through which flows current to be measured, an indicator movable with said coil, a source of light projecting rays centered on the indicator, and a scale having substantially uniform graduations, said scale being positioned in such angular relation to the normal position of the indicator that the beam of light emanating from said indicator will increase in its degree of movement per scale unit as its deflection is advanced along the scale until a maximum movement of the light beam is obtained at its most advanced position.

2. A system for measuring the transmission over an alternating current circuit, comprising a source of alternating current, a circuit whose transmission is to be measured and through which current from said source is transmitted, a rectifying device connected so as to rectify energy after transmission over said circuit, a meter connected with the rectifying device, a rotatable coil for the meter, through which flows a rectified current corresponding to an alternating current received over said circuit, an indicator movable with said coil, and a scale having substantially uniform graduations, said scale being so positioned that the indicator as it shifts from normal position moves through continually larger angles for successive divisions.

3. A system for measuring the transmission over an alternating current circuit comprising a source of alternating current, a circuit whose transmission is to be measured and through which current from said source is transmitted, a rectifying device connected so as to rectify energy after transmission over said circuit, a meter connected with the rectifying device, a rotatable coil for the meter through which flows a rectified current corresponding to an alternating current received over said circuit, an indicator movable with said coil, and a scale having substantially uniform graduations, said scale being so positioned that the indicator as it shifts from normal position moves through continually larger angles for successive equal scale divisions.

4. A system for measuring the transmission over an alternating current circuit, comprising a source of alternating current, a circuit whose transmission is to be measured and through which current from said source is transmitted, a rectifying device connected so as to rectify energy after transmission over said circuit, a meter connected with the rectifying device, a rotatable coil for the meter through which flows a rectified current corresponding to an alternating current received over said circuit, an indicator movable with said coil, a source of light projecting rays centered on the indicator, and a scale having substantially uniform graduations, said scale being positioned in such angular relation to the normal position of the indicator that the beam of light emanating from said indicator will increase in its degree of movement per scale unit as its deflection is advanced along the scale until a maximum movement of the light beam is obtained at its most advanced position.

In testimony whereof, I have signed my name to this specification this 24th day of February, 1928.

FRED H. BEST.